(12) United States Patent
Tomberlin et al.

(10) Patent No.: US 12,490,725 B2
(45) Date of Patent: Dec. 9, 2025

(54) LONG-TERM STORAGE OF BLACK SOLDIER FLY LARVAE

(71) Applicant: The Texas A & M University System, College Station, TX (US)

(72) Inventors: Jeffery K. Tomberlin, College Station, TX (US); Fengchun Yang, College Station, TX (US); Jonathan A. Cammack, College Station, TX (US)

(73) Assignee: The Texas A&M University System, College Station, TX (US)

( * ) Notice: Subject to any disclaimer, the term of this patent is extended or adjusted under 35 U.S.C. 154(b) by 371 days.

(21) Appl. No.: 18/331,595

(22) Filed: Jun. 8, 2023

(65) Prior Publication Data

US 2023/0320333 A1    Oct. 12, 2023

Related U.S. Application Data

(63) Continuation of application No. 17/006,268, filed on Aug. 28, 2020, now abandoned, which is a
(Continued)

(51) Int. Cl.
*A01K 67/368* (2025.01)
*A01K 67/34* (2025.01)
(Continued)

(52) U.S. Cl.
CPC ............ *A01K 67/368* (2025.01); *A01K 67/34* (2025.01); *A23K 10/18* (2016.05); *A23K 10/37* (2016.05);
(Continued)

(58) Field of Classification Search
CPC ...... A01K 67/34; A01K 67/36; A01K 67/362; A01K 67/368
See application file for complete search history.

(56) References Cited

U.S. PATENT DOCUMENTS

| | | | | | |
|---|---|---|---|---|---|
| 4,334,498 | A | * | 6/1982 | Bedding | A01N 63/12 119/6.7 |
| 4,417,545 | A | * | 11/1983 | Finney | A01K 67/30 119/6.6 |

(Continued)

FOREIGN PATENT DOCUMENTS

| CN | 103548780 A | 2/2014 |
|---|---|---|
| CN | 105851719 A | 8/2016 |

(Continued)

OTHER PUBLICATIONS

Brits, "Improving feeding efficiencies of black soldier fly larvae, *Hermetia illucens* (L., 1758) (Diptera: Stratiomyidae: Hermetiinae) through manipulation of feeding conditions for industrial mass rearing," Dissertation, Stellenbosch University, 2017.
(Continued)

*Primary Examiner* — Morgan T Jordan
(74) *Attorney, Agent, or Firm* — McKee, Voorhees & Sease, PLC

(57) ABSTRACT

The present disclosure provides compositions and methods for long-term storage, shipping, and stable production of black soldier flies, capable of use in waste remediation or protein production. The invention overcomes drawbacks associated with current methods of using black soldier flies, significantly increasing the period during which black soldier fly neonates can be stored and the time in which larvae mature.

21 Claims, 7 Drawing Sheets

Related U.S. Application Data continuation-in-part of application No. PCT/US2018/027252, filed on Apr. 12, 2018.

(51) Int. Cl.
  *A01K 67/362* (2025.01)
  *A23K 10/18* (2016.01)
  *A23K 10/37* (2016.01)
  *B09B 3/65* (2022.01)
  *A23L 33/17* (2016.01)

(52) U.S. Cl.
  CPC .............. *B09B 3/65* (2022.01); *A01K 67/362* (2025.01); *A23L 33/17* (2016.08)

(56) References Cited

U.S. PATENT DOCUMENTS

| | | | |
|---|---|---|---|
| 8,815,539 B1 | 8/2014 | Popa et al. | |
| 11,464,204 B2 | 10/2022 | Kilsdonk et al. | |
| 2004/0159288 A1* | 8/2004 | Olive | A01K 67/30 119/6.7 |
| 2012/0187041 A1* | 7/2012 | Popa | C02F 3/327 119/6.5 |
| 2012/0325152 A1* | 12/2012 | Hopkins | A01K 67/30 800/13 |
| 2014/0020630 A1 | 1/2014 | Courtright | |
| 2016/0219887 A1 | 8/2016 | Vickerson et al. | |
| 2018/0360008 A1* | 12/2018 | Popa | A23K 50/00 |
| 2019/0085279 A1* | 3/2019 | Leo | A23L 2/60 |
| 2019/0246591 A1* | 8/2019 | Leo | B01D 11/0257 |
| 2023/0022621 A1* | 1/2023 | Doane | A01K 67/30 |
| 2023/0320333 A1* | 10/2023 | Tomberlin | A01K 67/368 119/6.5 |
| 2024/0196873 A1* | 6/2024 | Luber | A01K 67/68 |
| 2025/0081948 A1* | 3/2025 | Unger | A01K 67/362 |
| 2025/0160309 A1* | 5/2025 | Wooding | A01K 67/362 |

FOREIGN PATENT DOCUMENTS

| | | | |
|---|---|---|---|
| CN | 106359850 A | 2/2017 | |
| CN | 107114328 A | 9/2017 | |
| WO | 2016024910 A1 | 2/2016 | |
| WO | 2019154563 A1 | 8/2019 | |
| WO | WO-2023042404 A1 * | 3/2023 | ........... A01K 67/362 |
| WO | WO-2023055909 A2 * | 4/2023 | ............. A01K 67/30 |
| WO | WO-2024105083 A1 * | 5/2024 | ............. A01K 67/30 |

OTHER PUBLICATIONS

Hogsette, "New Diets for Production of House Flies and Stable Flies (*Diptera: muscidae*) in the Laboratory," Journal of Economic Entomology 85(6):2291-4, 1992.

International Search Report and Written Opinion regarding International Application No. PCT/US 2018/027252, dated Aug. 13, 2018, 14 pages.

Kok, et al., "Effect of pH and temperature on the growth and B-Glucosidase activity of Lactobacillus Rhamnosus NRRL 442 in anaerobic fermentation," International Review of Chemical Engineering 4(3): 293-299, 2012.

Myers, et al., "Development of black soldier fly (*Diptera : stratiomyidae*) larvae fed dairy manure" Environ. Entomol. 37: 11-15, 2008.

Oonincx, et al., "Feed Conversion, Survival and Development, and Composition of Four Insect Species on Diets Composed of Food By-Products," PLoS One 10: 20, 2015.

Sheppard, et al., "Rearing methods for the black soldier fly (*Diptera : stratiomyidae*)," Journal of Medical Entomology 39: 695-698, 2002.

Tomberlin, et al., "Selected life-history traits of black soldier flies (*Diptera: stratiomyidae*) reared on three artificial diets," Ann. Entomol. Soc. Am. 95: 379-386, 2002.

Zimmermann, et al. Overview of variety of trials on agricultural applications of effective microorganisms, Agricola, 17-26, 2008.

* cited by examiner

LONG-TERM STORAGE OF BLACK SOLDIER FLY LARVAE

CROSS REFERENCE TO RELATED APPLICATIONS

This application is a continuation of U.S. application Ser. No. 17/006,268, titled "Black Soldier Fly Bullet," and filed Aug. 28, 2020 by the Texas A&M University System, which application is a continuation-in-part of International Application No. PCT/US2018/027252, titled "Black Soldier Fly Bullet." and filed Apr. 12, 2018_by the Texas A&M University System, the entire disclosure of which applications is incorporated herein by reference.

FIELD OF THE INVENTION

The present disclosure relates to the field of biotechnology. More specifically, the disclosure relates to compositions and methods for long-term storage, shipping, and stable production of black soldier flies.

BACKGROUND

The production of black soldier flies as a protein source, or use of them to reduce waste is dependent on maintaining a robust population. Current methods rely on the inoculation of media or waste with black soldier fly eggs or neonates (recently hatched larvae). Development time from inoculation to harvest is approximately three weeks. The current system is susceptible to mass larval mortality, unpredictable larval size at harvest, and as a consequence, unpredictable larval harvest. Furthermore, current methods do not allow storage of eggs or larvae beyond 2 to 4 days, after which they die.

What is needed are new compositions and methods that allow for long-term storage, shipping, and stable and reproducible production of black soldier flies.

SUMMARY OF THE INVENTION

The present disclosure provides a composition for storage or shipping of black soldier fly larvae, comprising a container, a layer of fermented nutrient source in the bottom of the container (the bottom layer), black soldier fly larvae on top of the layer of fermented nutrient source (the middle layer), a layer of dry nutrient source on top of the black soldier fly larvae (the top layer), and a cover on top of the container that allows air to pass into and out of the container.

In general, the container used in the composition can be of any desired size. In certain embodiments the container is about 300 ml, about 350 ml, about 400 ml, about 450 ml, about 500 ml, about 550 ml, about 600 ml, about 650 ml, about 700 ml, about 750 ml, about 800 ml, about 850 ml, about 900 ml, about 950 ml or about 100 ml in size. Although the size of the container can be based on volumetric values, as described above, in some embodiments the size can be based on other parameters, such as, but not limited to, weight. In various embodiments the container has tapered sides, with the taper increasing or decreasing from the bottom of the container to the top of the container, straight sides, or irregular sides having a variety of angles and/or widths.

In some embodiments, once the layer of fermented nutrient source in the bottom of the container, the layer of black soldier fly larvae on top of the layer of fermented nutrient source, and the layer of dry nutrient source on top of the black soldier fly larvae has been added to the container, the container will also have a void volume between the top layer (the layer of dry nutrient source) and the top of the container after the cover or lid is placed on the container to close or seal the container. In general, the void volume should sufficient to maintain a relatively constant or relatively uniform moisture and temperature in the layer of fermented nutrient source (the bottom layer of the container). Since failure to maintain a relatively constant or relatively uniform moisture and temperature in the layer of fermented nutrient source can lead to spoilage of the fermented nutrient source, the void volume should be sufficient to avoid spoilage of the fermented nutrient source.

In particular embodiments the container used in the composition can have a solid bottom (such that the container will not leak or lose liquid through the bottom of the container) and an open or partially open top, for example a top that defines a single opening or a plurality of openings. In further embodiments the container is impermeable to gas, such as, but not limited to, air, or liquid, such as, but not limited to, water. In general the container can be made from, or comprise, a variety of different materials, or a combination of such materials. In various embodiments the container is made from, or comprised of, glass, plastic or metal, or any combination thereof. In other embodiments, the container is specifically designed to avoid the presence of microclimates in the container, or in the various layers within the container.

The same nutrient source can used in both the bottom layer (which is fermented) and the top layer (which is dry) of the container, although in some embodiments a first nutrient source is fermented and used in the bottom layer while a second nutrient source is used dry (without any added liquid) in the top layer of the container. Although any nutrient source that will support the long-term storage or shipping of black soldier fly larvae can be used in conjunction with the presently described compositions and methods, in certain embodiments the nutrient source is about 50% wheat bran, 30% alfalfa meal and 20% corn meal by volume.

In general, the fermented nutrient source is produced using a probiotic culture. In some embodiments the probiotic culture includes a single species of lactic acid bacteria, while in other embodiments the probiotic culture comprises a plurality of species of lactic acid bacteria. A large variety of lactic acid bacteria are well-known to those of skill in the art, and can be used in the presently disclosed probiotic culture. The probiotic culture can include, but is not limited to, *Bifidobacterium animalis, Bifidobacterium bifidum, Bifidobacterium longum, Lactobacillus acidophilus, Lactobacillus casei, Lactobacillus delbrueckii* subsp *bulgaricus. Lactobacillus fermentum, Lactobacillus plantarum, Lactococcus lactis* subsp *lactis* or *Streptococcus thermophilus*, or any combination thereof. In further embodiments, the probiotic culture comprises one or more species of lactic acid bacteria and a yeast, for example *Saccharomyces cerevisiae*, or a different bacteria, for example *Bacillus subtilis* or a member of the Bradyrhizobiaceae family of bacteria, or combinations thereof.

In certain embodiments the nutrient source is fermented for at least 24 hours, at least 48 hours, at least 72 hours, at least 96 hours, at least 5 days, at least 6 days, at least 1 week, at least 2 weeks, at least 3 weeks, at least 1 month, at least 2 months, at least 3 months, at least 4 months, at least 5 months, or at least 6 months or more. In some embodiments the nutrient source is fermented anaerobically. In other embodiments the nutrient source is fermented at about 65% moisture, at about 66% moisture, at about 67% moisture, at about 68% moisture, at about 69% moisture, at about 70% moisture, at about 71% moisture, at about 72% moisture, at about 73% moisture, at about 74% moisture, or at about 75% moisture. In additional embodiments the nutrient source is fermented at room temperature. As used herein throughout the present disclosure, the term "room temperature" means a temperature between about 22° C. and about 29° C. Thus, in various embodiments "room temperature" means about 22° C., about 23° C., about 24° C., about 25° C. about 26° C., about 27° C. about 28° C. or about 29° C.

In general, the probiotic culture is activated (or expanded) prior to use in the fermentation of the nutrient source. In certain embodiments the probiotic culture is activated in a solution comprising a nutrient source or feedstock and water. In some embodiments the nutrient source or feedstock is molasses. Various types of molasses are known to those of skill in the art and can be used as the nutrient source or feedstock, including, but not limited to, light molasses, dark molasses, blackstrap molasses, sulphured molasses, or unsulphured molasses. Molasses is generally made from sugarcane or sugar beets, and can vary by the amount of sugar, the method of extraction and the age of the plant. However, molasses made from other sources, including, but not limited to, sorghum, pomegranate, carob or dates, can be used in particular embodiments of the present disclosure.

The ratio of the probiotic culture to the nutrient source or feedstock can vary, but is generally about 1:1, but this ratio can vary by about 20% or so in certain embodiments. In addition, the ratio of the probiotic culture/nutrient source to water can also vary, but is generally about 1:20, although this ratio can also vary by about 20% or so in other embodiments. Thus, in particular embodiments the ratio of probiotic culture to molasses to water is about 1:1:20. In some embodiments the probiotic culture is activated or expanded for at least one week, while in various other embodiments the probiotic culture is activated or expanded for at least 2 weeks, at least 3 weeks, at least 1 month, at least 2 months, at least 3 months, at least 4 months, at least 5 months, or at least 6 months or more. In further embodiments the probiotic culture is activated or expanded anaerobically. In still further embodiments the probiotic culture is activated or expanded at room temperature.

In general neonate black soldier fly larvae are used in the presently disclosed compositions and methods. The term "neonate black soldier fly larvae." as used herein, means black soldier fly larvae from the time of eclosion (or hatching) until just before the black soldier fly larvae have molted. Once black soldier fly larvae molt, they are no longer considered to be "neonate black soldier fly larvae." Thus in some embodiments the black soldier fly larvae have not molted, and are used between eclosion and 36 hours of eclosion. In various other embodiments the black soldier fly larvae are used just after eclosion, 1 hour after eclosion, 2 hours after eclosion, 3 hours after eclosion, 4 hours after eclosion, 5 hours after eclosion, 6 hours after eclosion, 12 hours after eclosion, 18 hours after eclosion, 24 hours after eclosion, 30 hours after eclosion, 36 hours after eclosion, or just prior to the molting of the black soldier fly larvae.

The amount of black soldier fly larvae used as the middle layer in the container (on top of the layer of fermented nutrient source and under the layer of dry nutrient source) can vary, depending on the size and shape of the container. However, in general, the number of black soldier neonate larvae used as the middle layer of the composition is about 60, about 65, about 70, about 75, about 80, about 85 or about 90 or more neonate larvae per gram of fermented nutrient source. Thus, in certain embodiments about 12,000, about 13,000, about 14.000, about 15,000, about 16.000, about 17.000 or about 18,000 black soldier fly larvae are used as the middle layer of the composition, on top of the bottom layer of fermented nutrient source.

The present disclosure also provides a method of storing, or long-term storage of, black soldier fly larvae, comprising placing black soldier fly larvae between a layer of fermented nutrient source and a layer of dry nutrient source in a container with a cover that allows air to pass into and out of the container. Since the art is devoid of any method of storing black soldier fly larvae, for any period of time, as used herein the term "long-term storage of black soldier fly larvae" means storage for any period of time between 1 week and 5 months or more. Thus, in various embodiments the black soldier fly larvae are stored for between about 2 weeks and about 5 months, between about 2 weeks and about 4 months, between about 2 weeks and about 3 months, between about 2 weeks and about 2 months, between about 2 weeks and about 1 month, between about 2 weeks and about 3 weeks, between about 3 weeks and about 5 months, between about 1 month and about 5 months, between about 2 months and about 5 months, between about 3 months and about 5 months, between about 4 months and about 5 months, between about 3 weeks and about 4 months, or between about 1 month and about 3 months. In still other embodiments the black soldier fly larvae are stored for about 1 week, about 2 weeks, about 3 weeks, about 1 months, about 2 months, about 3 months, about 4 months, or about 5 months or more. In certain embodiments the black soldier fly larvae are stored for between about 4 weeks and about 6 weeks. In some embodiments the black soldier fly larvae are stored at room temperature.

The present disclosure additionally provides a method of producing black soldier fly larvae, comprising inoculating organic material with a composition comprising a fermented nutrient source, black soldier fly larvae, and a dry nutrient source, incubating the inoculated organic material for about 6 days, about 7 days, about 8 days, about 9 days, or about 10 days or more, and collecting the black soldier fly larvae produced. In various embodiments the organic material can be organic waste to be digested (bioremediation) or an organic nutrient source or feedstock for use in protein production.

The present disclosure further provides a method of digesting organic waste, comprising inoculating organic waste with a composition comprising a fermented nutrient source, black soldier fly larvae, and a dry nutrient source, and incubating the organic waste for about 6 days, about 7 days, about 8 days, about 9 days, or about 10 days or more.

The present disclosure also provides a media comprising a nutrient source and a probiotic culture comprising at least a first lactic acid bacteria. In certain embodiments the nutrient source comprises wheat bran, alfalfa meal and corn meal in a volume ratio of about 5:3:2. In some embodiments the nutrient source and the probiotic culture are allowed to ferment for at least 24 hours under anaerobic conditions prior to use.

BRIEF DESCRIPTION OF THE DRAWINGS

For a more complete understanding of the features and advantages of the present disclosure, reference is now made to the detailed description of the disclosure along with the accompanying figures. The drawings described herein are for illustration purposes only and are not intended to limit the scope of the present teachings in any way.

DETAILED DESCRIPTION

Figure 1:
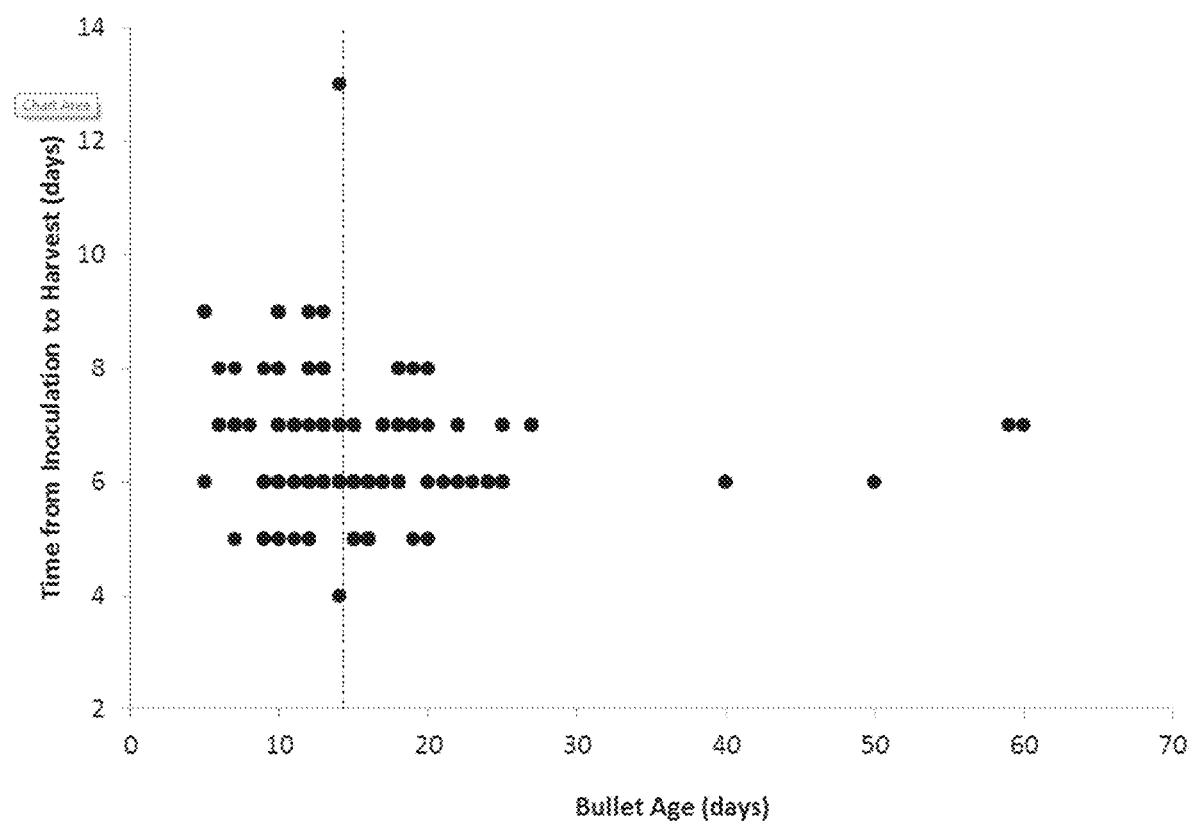
FIG. 1: Relationship between time from inoculation to harvest (days) and bullet age (days). The average bullet age of 14.31 days is represented by the dashed vertical line.

The present disclosure describes compositions and methods for the long-term storage, shipping, and stable production of black soldier flies. Mass production of the black soldier fly *Hennetia illucens* (Diptera: Stratiomyidae), relies on the production of eggs from the black soldier fly, hatching them, and using the larvae to recycle wastes or to produce protein and fat. Among the primary drawbacks with this system are: 1) unpredictable production of eggs; 2) unpredictable hatch time, necessitating use of larvae when produced from eggs; 3) unpredictable egg hatch rate; 4) unpredictable mortality rate of newly hatched larvae; and 5) unpredictable duration of larval development. These issues result in unpredictable mass production and inefficiencies. In addition, a major drawback of this system is the lack of the ability to store the larvae more than 2-4 days after hatching, after which they die.

The present disclosure overcomes these and other drawbacks associated with current methods of using black soldier flies. One aspect of the present disclosure is a container ("bullet") for storing or shipping black soldier fly neonates that can be prepared and stored at room temperature for up to 5 months or longer. Furthermore, when used to produce larvae, the larvae are mature in 5-10 days, as opposed to 20 days using current practices, with minimal mortality and predictable larval harvest. The present disclosure has the following advantages over the systems that are currently in use: 1) reduces concerns with adult fly maintenance, as the "bullets" can be stored long-term and are more durable for shipping; 2) accelerates conversion of food (media or waste) to larval protein/fat by 75%; and, 3) allows for predictable production of larval protein/fat.

In one embodiment, the bullet comprises a container, a layer of fermented nutrient source in the bottom of the container, black soldier fly larvae on top of the layer of fermented nutrient source, a layer of dry nutrient source on top of the black soldier fly larvae, and a cover on top of the container that allows air to pass into and out of the container. Certain aspects of the present disclosure are discussed in greater detail below.

I. Probiotic Culture and Activation

The present disclosure involves in part the use of a probiotic culture to ferment a nutrient source. In certain embodiments the probiotic culture comprises one or more lactic acid bacteria species. Such species can include, but are not limited to, *Bifidobacterium animalis*, *Bifidobacterium bifidum*. *Bifidobacterium longum*, *Lactobacillus acidophilus*, *Lactobacillus casei*. *Lactobacillus delbrueckii* subsp *bulgaricus*, *Lactobacillus fermentum*, *Lactobacillus plantarum*, *Lactococcus lactis* subsp *lactis* or *Streptococcus thermophilus*. In some embodiments, the probiotic culture can include yeast, such as, but not limited to, *Saccharomyces cerevisiae*, or other bacteria, such as, but not limited to, *Bacillus subtilis*. In further embodiments, the probiotic culture can include a phototropic bacteria, including, but not limited to, members of the Bradyrhizobiaceae family of bacteria.

In addition, commercial sources of probiotic culture are available. Examples of commercially available probiotic cultures include, but are not limited to, EM-1®, which is available from TeraGanix, Inc. (Alto. TX), and ProBio Balance, which is available from SCD Probiotics (Kansas City, MO).

In general the probiotic culture is activated (or expanded) for at least one week, or up to 6 months or more, prior to use in fermentation of the nutrient source. In certain embodiments the probiotic culture is activated by incubating the probiotic culture with a nutrient source, commonly molasses (light, dark, blackstrap, sulphured, or unsulphured) with water at room temperature (about 24° C. to 27° C.) under anaerobic conditions. The ratio of probiotic culture to nutrient source to water can vary, but in various embodiments the ratio is about 1:1:10, 1:1:15, 1:1:20, 1:1:25 or 1:1:30. In certain embodiments each of the individual values of the above ratios can vary by about 20%.

II. Nutrient Source and Fermentation

The bullet composition disclosed herein generally comprises a base layer of a fermented nutrient source. The nutrient source is fermented using the expanded or activated probiotic culture for at least 24 hours, or up to 6 months or more, prior to use.

A variety of nutrient sources (feed) can be utilized in the present disclosure. In general, the nutrient source comprises wheat bran, alfalfa meal and corn meal. In certain embodiments the nutrient source comprises 50% wheat bran, 30% alfalfa meal and 20% corn meal by volume (volume ratio of about 5:3:2), or 28% wheat bran, 42% alfalfa meal and 30% corn meal by weight (weight ratio of about 2.8:4.2:3).

A number of different formulations of nutrient sources for black soldier flies are known to those of skill in the art, such as, but not limited to, Gainesville House Fly Diet (Hogsette, *J. Econ. Entomol.* 85:2291-2294, 1992). Some of these formulations are commercially available.

In general, some of the nutrient source is fermented by hydrating the nutrient source to about 70% moisture (±2-3%) with water and the activated probiotic culture, and incubating at about room temperature (about 24° C. to 27° C.) under anaerobic conditions. However, certain aspects of the present disclosure also utilize "dry" nutrient source. As used herein the term "dry nutrient source" means nutrient source to which no additional water or liquid has been added after formulation of the nutrient source.

III. Production of Black Soldier Fly Larvae

Black soldier fly eggs are collected in strips of corrugated cardboard, essentially as previously described (Sheppard, et al., *J. Med. Entomol.* 39:695-698, 2002. Tomberlin, et al., *Ann. Entomol. Soc. Am.* 95:379-386, 2002). The eggs are held at about room temperature (about 24° C. to 27° C.) at between about 50% and about 70% relative humidity, for example at about 50%, about 55%, about 60%, about 65% or about 70% relative humidity, until eclosion. If the relative humidity is too low, the eggs will dry up and die. If the relative humidity is too high, the eggs will not hatch. The neonate larvae are collected at any time after eclosion up to 36 hours after eclosion for addition to the bullet. Larvae are designated as neonate larvae if they have not yet molted.

IV. Bullet Specifications

The black soldier fly bullet is prepared in a container that is impermeable to gas and liquids, but with a breathable top that seals the container and allows air to pass into and out of the sealed container. In general the container will comprise a void volume near the top of the container, sufficient to maintain a uniform or constant moisture and temperature throughout the fermented media in the bottom of the container. Failure to maintain a uniform or constant moisture and temperature throughout the fermented media in the bottom of the container can lead to spoilage of the fermented media. Therefore the void volume is sufficient to avoid the presence of microclimates in the container, and in the fermented media.

A base layer of the probiotic fermented nutrient source is placed in the bottom of the container. Then neonate larvae are placed on top of the fermented nutrient source, and dry (unfermented) nutrient source is placed on top of the larvae. In general, the ratio of fermented nutrient source to dry nutrient source is about 5:1, about 6:1 or about 7:1, depending on the container used to create the bullet. The amount of black soldier neonate larvae added to the bullet can vary somewhat, but in general is about 70, about 75, or about 80 or more neonate larvae per gram of fermented nutrient source.

The container can generally be of any configuration, for example tapered from narrower at the bottom to wider at the top, tapered from wider at the bottom to narrower at the top, or with straight sides, of any shape, for example generally circular, generally square, or generally oval, and made from any material, such as, but not limited to, plastic, glass or metal, or combinations thereof, so long as the container is impermeable to gas and liquid.

The bullet with the fermented nutrient source, neonate black soldier fly larvae and dry nutrient source are then stored uncovered for about 2-4 days, for example about 3 days at about room temperature (about 24° C. to 27° C.) at a relative humidity of about between about 50% and about 70%, for example about 50%, about 55%, about 60%, about 65% or about 70% relative humidity. Then the bullet is covered (scaled) with the breathable lid or top, and stored for up to 6 months or more at about room temperature (about 24° C. to 27° C.). The present disclosure thus provides for the first time stable young (immature) larvae that can be stored for up to 6 months or more.

The bullet can be used to inoculate the desired organic material (organic waste for bioremediation, or other organic material for protein production) any time after 5 days of storage. In general, for bioremediation (or bioconversion) of organic waste, a high bullet to feed stock ratio is preferable, while a low bullet to feed stock ration is preferable when the black soldier fly larvae are to be used as a protein source.

EXAMPLES

The following examples are included to demonstrate preferred embodiments of the present disclosure. It should be appreciated by those of skill in the art that the techniques disclosed in the examples, which follow represent techniques discovered by the inventors to function well in the practice of the present disclosure, and thus can be considered to constitute preferred modes for its practice. However, those of skill in the art should, in light of the present disclosure, appreciate that many changes can be made in the specific embodiments, which are disclosed and still obtain a like or similar result without departing from the spirit and scope of the present disclosure.

Example 1: Preparation of Probiotic Culture

The probiotic culture is prepared by mixing concentrated EM-1® Microbial Inoculant (TeraGanix. Inc., Alto. TX, USA), Golden Barrel Unsulfured Blackstrap Molasses (Zook Molasses Company, Honey Brook, PA, USA), and warm water at a ratio of 1:1:20. Ingredients are combined and kept at room temperature (~27° C.), under anaerobic conditions (using an air lock), for at least one week prior to use.

Example 2: Preparation and Fermentation of Feed

The feed is composed of the Gainesville House fly Diet (Hogsette, *J. Econ. Entomol.* 85:2291-2294, 1992), which is 50% wheat bran, 30% alfalfa meal, and 20% corn meal, by volume, hydrated to approximately 70% moisture. Approximately 22.7 kg of Gainesville diet is mixed with 56 L of water and 150 ml of expanded probiotic culture, and allowed to ferment anaerobically at room temperature (~27° C.) for at least 24 hours prior to use.

Example 3: Collection and Incubation of Black Soldier Fly Eggs and Neonates

Eggs are collected in strips of corrugated cardboard using essentially the method as previously described (Sheppard, et al., *J. Med. Entomol.* 39:695-698, 2002, Tomberlin, et al., *Ann. Entomol. Soc. Am.* 95:379-386, 2002), and held at about 27° C. and 55% relative humidity until eclosion. Within 24 hours of eclosion, neonate larvae are harvested and aliquoted for inoculation into the "bullets."

Example 4: Black Soldier Fly Bullet Preparation

Figure 6:
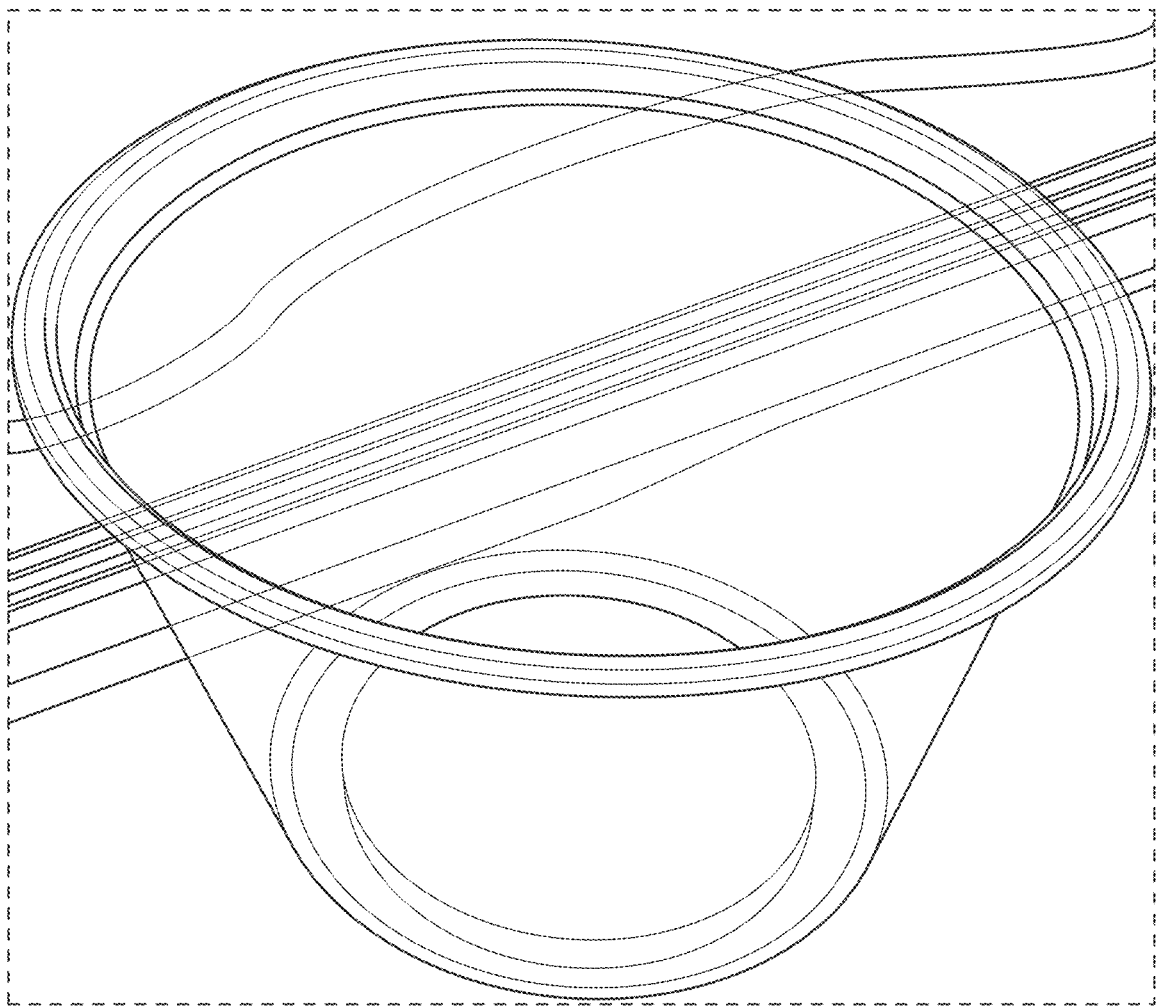
FIG. 6: Example of 500 ml container used for black soldier fly bullet preparation. The container shown has top diameter of about 11-12 cm, a bottom diameter of about 8 cm, and a height of about 8 cm.

A Black Soldier Fly bullet is prepared by placing 200 g of probiotic fermented Gainesville Diet (at 70% moisture) into a 500 ml container (example shown in FIG. 6). In the container shown in FIG. 6, this is about 4-5 cm of fermented feed at the bottom of the container. Approximately 15,000 neonate larvae less than 24 hours old are placed on top of the diet, using a level, 0.61 ml scoop (⅛ tsp, ~0.2 g). An additional 35 g of dry Gainesville Diet is then placed on top of the wet diet/larvae (in the container shown in FIG. 6, this is about 1 cm of dry feed). The additional dry feed on top of the larvae serves two purposes: 1) to absorb any excess moisture that accumulates around the edges of the wet diet and prevent neonate drowning; and 2) to provide a dry barrier that prevents neonate larvae from escaping from the container. The bullet is then stored uncovered for 3 days at about 27° C. and 55% relative humidity. It is then covered with a breathable lid that allows air to transfer into and out of the container, and can be used for colony production or waste management at a minimum age of 5 to 6 days.

Example 5: Results Using a Black Fly Soldier Bullet

When Black Soldier Fly Bullets were used to inoculate pans of organic material, the average time from inoculation to harvest was 6.51 days, for data collected from 460 pans.

These 460 pans resulted in the digestion of approximately 3.2 metric tons of organic material and the production of approximately 405 kg of live larvae. For 318 of these pans, data was collected on both time to harvest and bullet age, and the mean age of a bullet used for these pans was 14.31 days (FIG. 1).

Figure 3:
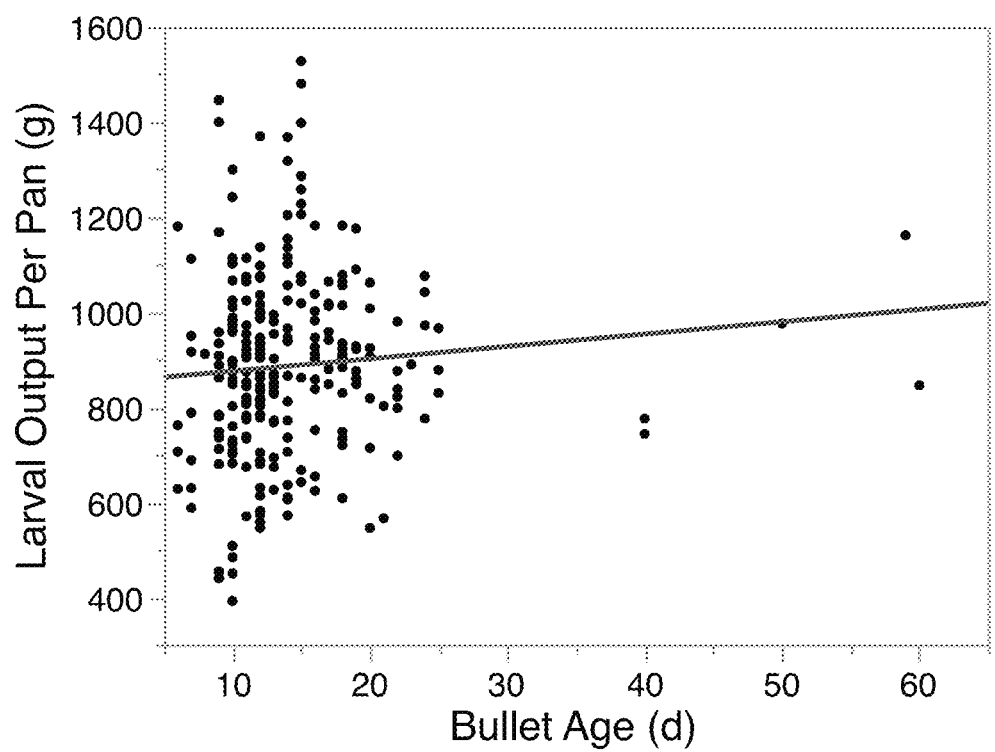
FIG. 3: Relationship between total pan output (g) and age (d) of the Black Soldier Fly Bullet used to inoculate the pan. The line represents a regression of the data.
Figure 4:
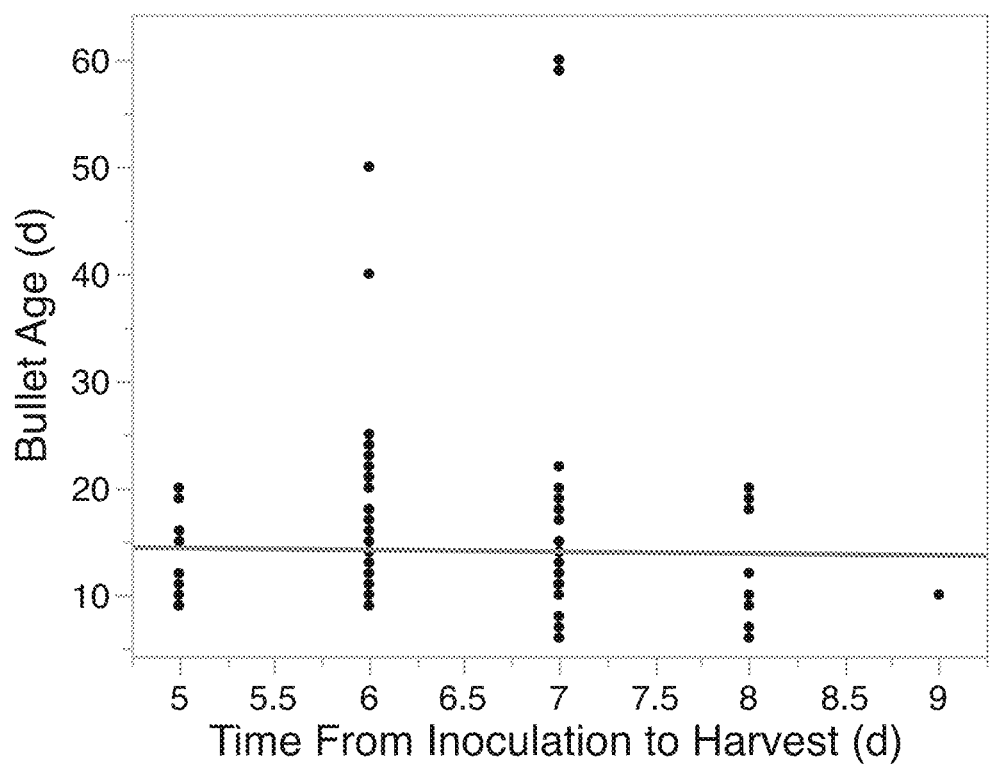
FIG. 4: Relationship between Black Soldier Fly Bullet age (d) and the amount of time from inoculation to harvest (d). The line represents a regression of the data.

Although the average time to harvest was approximately 6.5 days, there was a significantly positive (p<0.0001) relationship between time to harvest and pan output (FIG. 2), with pans producing approximately 150 g more larvae when reared for an additional three days. FIG. 3 shows the relationship between bullet age and pan output; there was no significant relationship (p=0.15) between these two variables. There was also no significant relationship (p=0.73) between bullet age (days) and time from inoculation to harvest (days) (FIG. 4).

Figure 5:
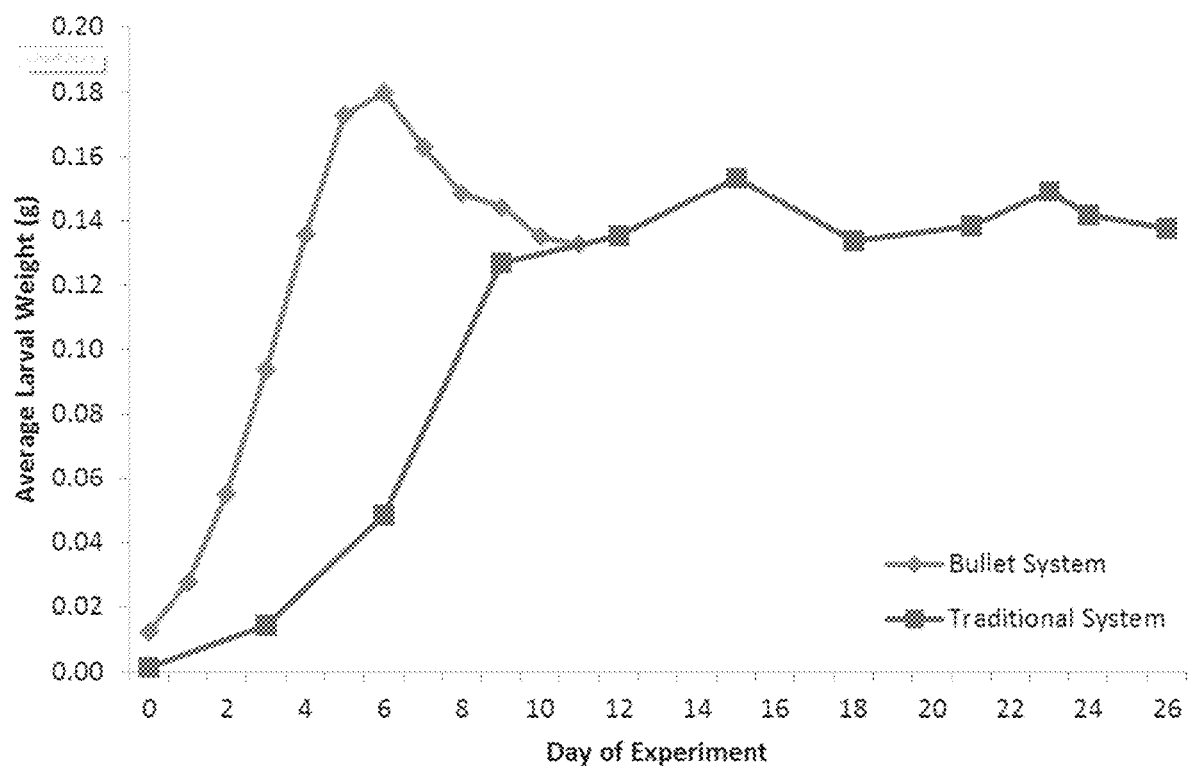
FIG. 5: Larval development on swine manure when using the bullet system in comparison to a traditional experiment started with 4 d old larvae.

When reared on swine manure, larvae from the presently disclosed bullets develop faster and grow larger when compared to experiments started with 4 day old larvae (FIG. 5). Larval weight peaks on day 6 when using the presently disclosed bullet system, indicating this is the best point at which to harvest the larvae for maximum biomass production. This corresponds well with an embodiment of harvesting larvae at approximately 6.5 days after inoculation into the food resource.

Figure 2:
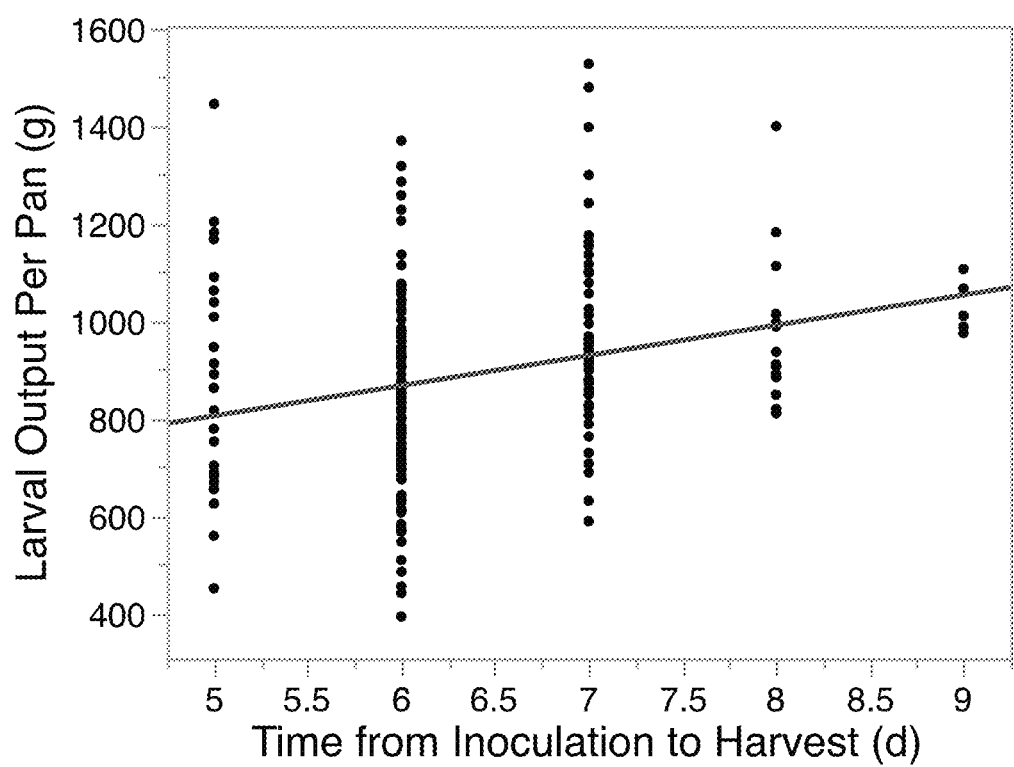
FIG. 2: Relationship between total pan output (g) and time from pan inoculation to harvest (d). The line represents a regression of the data.

Although FIG. 2 indicates that allowing the larvae to feed longer increases the total output per pan, the benefit of a 17% increase in production does not outweigh the cost of feeding the larvae for 50% more time, especially from an industrial standpoint where time and space would be at a premium. During that same amount of time, new pans of larvae could be digesting waste, and would already be in a phase of growing exponentially, as indicated from days 1 to 5 in FIG. 5.

The lack of a significant relationship between bullet age and output supports the ability of this method to allow for long term storage of larvae that can then be used for organic waste digestion, protein production, or black soldier fly colony maintenance. FIG. 1. FIG. 3 and FIG. 4 also provide support for the ability to use this method to buffer against inconsistent egg production or waste intake for up to 40-60 days or even longer, when the bullets are stored at approximately 22° C.

When compared to what is currently known about black soldier fly biology and production, the ability to achieve larval harvest in 6.51 days when using the presently disclosed system is a significant improvement over current methods used in both research and industry. For example, in experiments on Gainesville Diet started with 8-day-old larvae, larvae required an average of 13 days of feeding to mature, which is double that achieved when using the presently disclosed Black Soldier Fly Bullet System. A previous study conducted on dairy manure, starting with 4 day old larvae, also recorded long development times, with larvae requiring 29.3-31.5 days to complete development (Myers, et al., *Environ. Entomol.* 37:11-15, 2008). In another study where black soldier fly larvae were reared on mixtures of food processing by-products, larvae required 21-37 days to mature (Oonincx, et al., *PLoS One* 10:20, 2015).

Example 6: Using a Black Fly Soldier Bullet for Shipping

Figure 7:
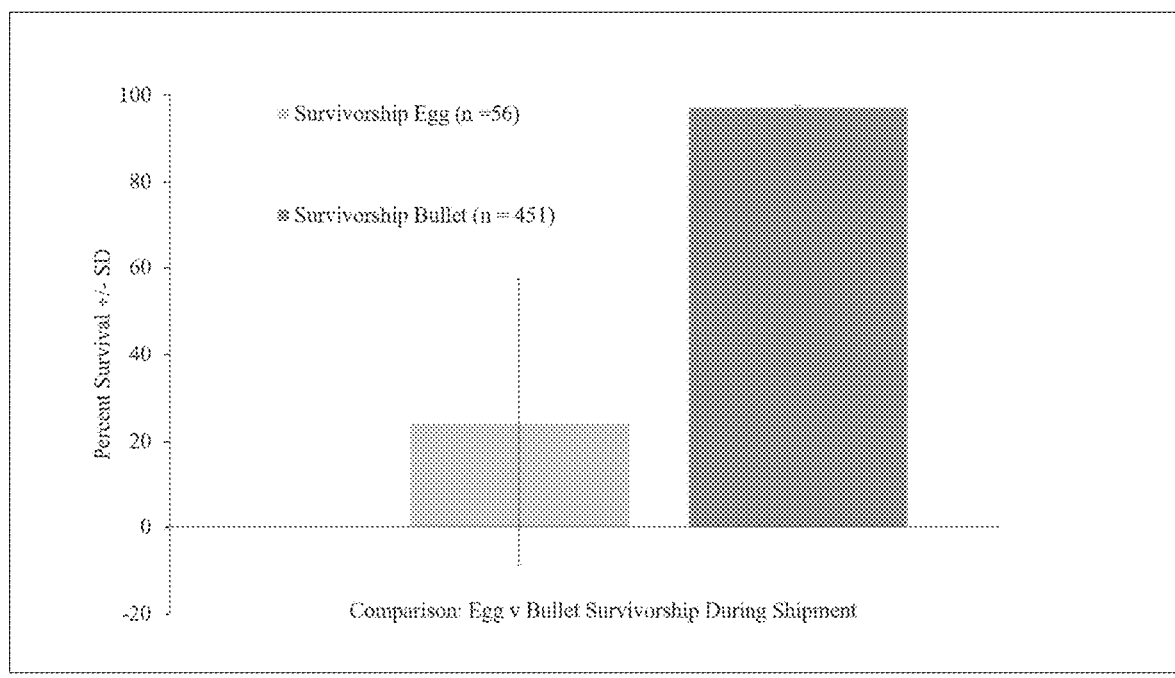
FIG. 7. Larval survival during shipment using the Black Soldier Fly Bullet.

Black Soldier Fly Bullets were prepared for shipping black soldier fly larvae as described in Example 4. Bullets were shipped to a location using a 48 hour commercial courier and viability was determined based on ability to be used. In addition, black soldier fly eggs (less than 24 hours old) were collected as described in Sheppard, et al., *J. Med. Entomol.* 39:695-698, 2002. Eggs were partitioned into 200 g allotments and shipped to a location using a 48 hour commercial courier. Egg viability was determined based on percent hatch. As shown in FIG. 7, 98% of larvae shipped in Black Soldier Fly Bullets were viable with minimal variability. In contrast, only 22% of black soldier fly eggs shipped using traditional shipping methods were viable with a high degree of variability (30%).

The term "about" is used herein to indicate that a value includes the standard deviation of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." When not used in conjunction closed wording in the claims or specifically noted otherwise, the words "a" and "an" denote "one or more."

The terms "comprise," "have," and "include" are open-ended linking verbs. Any forms or tenses of one or more of these verbs, such as "comprises," "comprising," "has," "having," "includes," and "including." are also open-ended. For example, any method that "comprises." "has" or "includes" one or more steps is not limited to possessing only those one or more steps and also covers other unlisted steps. Similarly, any cell that "comprises," "has" or "includes" one or more traits is not limited to possessing only those one or more traits and covers other unlisted traits.

While the disclosure has been described in connection with specific embodiments thereof, it will be understood that the present disclosure is capable of further modifications by one of skill in the art. It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible. The present disclosure is therefore intended to encompass any variations, uses, or adaptations of the invention following, in general, the principles of the invention and including such departures from the present disclosure as come within known or customary practice within the art to which the invention pertains and as may be applied to the essential features herein before set forth.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

All publications, patents, and patent publications cited are incorporated by reference herein in their entirety for all purposes.

What is claimed is:

1. A method of decoupling hatching of neonate black soldier fly larvae from production, the method comprising:
    providing a container;
    disposing into the container a quantity of nutrient source sufficient for the larvae to enter and remain in a stable immature phase until removal, comprising:
        disposing a first layer of the nutrient source after fermentation in anaerobic conditions, the first layer being above a moisture threshold of at least 65% moisture; and,
        disposing a second layer of the nutrient source without prior fermentation, the second layer being below the moisture threshold;
    disposing neonate black soldier fly larvae into the container within 36 hours of eclosion such that the larvae are between the first layer and the second layer;
    closing the container;
    stowing the container without addition of food until removal of the larvae; and,
    removing the larvae from the container and disposing the larvae in organic material such that the larvae feed on the organic material and continue development.

2. A method of decoupling hatching of neonate black soldier fly larvae from production, the method comprising:
    disposing neonate black soldier fly larvae into a container with a quantity of nutrient source sufficient for the larvae to enter and remain in a stable immature phase until removal; and,
    closing the container,
    wherein at least a first layer of the nutrient source below the larvae is above a moisture threshold and a second layer of material below the moisture threshold is at least partially above the larvae such that the container may be stowed without addition of food.

3. The method of claim 2, further comprising disposing the second layer of material into the container above the larvae.

4. The method of claim 2, wherein the second layer of material comprises the nutrient source.

5. The method of claim 2, further comprising storing the container for a period of time without addition of food.

6. The method of claim 5, further comprising shipping the container during the period of time the container is stored without addition of food.

7. The method of claim 5, wherein the period of time is at least 2 weeks.

8. The method of claim 5, wherein the period of time is at least 1 month.

9. The method of claim 2, wherein the nutrient source of the first layer comprises fermented nutrient source.

10. The method of claim 9, further comprising fermenting the nutrient source under anaerobic conditions prior to disposing the larvae in the first layer of the nutrient source.

11. The method of claim 9, wherein the second layer of material comprises unfermented nutrient source.

12. The method of claim 9, wherein the nutrient source comprises probiotic culture.

13. The method of claim 2, wherein at least the first layer and the larvae are provided such that a ratio of the larvae to the nutrient source is at least 60 larvae per gram.

14. The method of claim 2, wherein the larvae are provided in the container such that a ratio of a volume of the container to a volume of the larvae is 500:0.61.

15. The method of claim 2, wherein the first layer and the second layer are provided such that a ratio of the first layer to the second layer is at least 5:1.

16. The method of claim 2, further comprising removing the larvae from the container and disposing the larvae in organic material such that the larvae feed on the organic material and continue development.

17. The method of claim 2, wherein the neonate black soldier fly larvae are disposed in the container after eclosion and before molting.

18. The method of claim 17, wherein the larvae are disposed in the container no later than 36 hours after eclosion.

19. The method of claim 2, wherein the moisture threshold is at least about 65% moisture.

20. The method of claim 2, wherein the moisture threshold is about 70% moisture.

21. The method of claim 2, wherein the moisture threshold is no more than about 75% moisture.

* * * * *